United States Patent [19]
Maxwell et al.

[11] Patent Number: 5,721,204
[45] Date of Patent: Feb. 24, 1998

[54] PAINT STRIPPING COMPOSITION

[75] Inventors: Jeffrey W. Maxwell, White Lake; Michael E. Moore, Farmington Hills; Stephen R. Summerfield, Chesterfield; David M. Tear, Wyandotte, all of Mich.

[73] Assignee: Gage Products Company, Ferndale, Mich.

[21] Appl. No.: 610,155

[22] Filed: Feb. 29, 1996

[51] Int. Cl.$^6$ .................................................. C11D 7/18
[52] U.S. Cl. ...................... 510/206; 510/372; 510/375; 510/405
[58] Field of Search .......................... 510/201–203, 510/206, 405, 370, 372, 375

[56] References Cited

U.S. PATENT DOCUMENTS

| | | | |
|---|---|---|---|
| 3,355,385 | 11/1967 | Mackley | 252/104 |
| 4,690,817 | 9/1987 | Davis et al. | 424/70 |
| 5,215,675 | 6/1993 | Wilkins et al. | 252/100 |
| 5,334,331 | 8/1994 | Fusiak | 252/542 |
| 5,425,893 | 6/1995 | Stevens | 252/166 |
| 5,454,985 | 10/1995 | Harbin | 252/558 |

FOREIGN PATENT DOCUMENTS

| | | |
|---|---|---|
| 4971302A | 8/1992 | European Pat. Off. |
| 2683541 | 5/1993 | France |

*Primary Examiner*—Margaret Einsmann
*Attorney, Agent, or Firm*—Gifford, Krass, Groh, Sprinkle, Patmore, Anderson & Citkowski, P.C.

[57] ABSTRACT

A paint stripping composition includes a peroxide, water and an organic solvent. The composition has a near-neutral pH. The solvents may include benzyl alcohol and/or cyclohexane dimethanol, and the peroxide may comprise hydrogen peroxide or urea peroxide.

9 Claims, No Drawings

5,721,204

PAINT STRIPPING COMPOSITION

FIELD OF THE INVENTION

This invention relates generally to paint stripping compositions. More specifically, the invention relates to paint stripping compositions having a near neutral pH. Most specifically, the invention relates to paint stripping compositions which include a peroxide therein.

BACKGROUND OF THE INVENTION

Paint strippers are important industrial chemicals and are used both in the finishing of manufactured articles, and in the clean up of painting facilities. One high volume use of paint strippers is for cleaning paint spray booths and material handling equipment in the automotive industry. The aircraft industry also uses significant amounts of paint stripping compositions for removing paint from aircraft bodies in preparation for their repainting. Such use is particularly complicated by the fact that many aircraft bodies are painted with high strength, resin based paints, to resist harsh environmental conditions encountered during flight. These paints are relatively difficult to strip, and their removal is further complicated by the fact that many aircraft alloys are corroded by highly acidic or alkaline materials.

The threshold requirements for a good paint stripping composition are that it provide quick stripping action, and that it does not harm the parts being stripped. This last requirement is particularly critical in the aircraft industry, where aircraft skins are typically fairly thin, and where high degrees of integrity must be retained; hence, even minor corrosion of the aircraft cannot be tolerated. It is also quite important that a paint stripping composition, particularly one used in large volumes by industry, be non-hazardous, and of low toxicity to plant and animal life so as to minimize both potential harm and costs associated with its disposal and handling. Toward that end, it is preferred that the stripping composition be of fairly low volatility and flammability, and preferably be nonflammable. It is also desirable that the paint stripping composition be either soluble or dispersable in water so as to facilitate the rinsibility of stripped parts. Finally, it is important that any stripping composition used in relatively large volumes be of low cost and/or readily recoverable for reuse.

There are a large number of paint stripping compositions known in the art; however, the prior art is still deficient in providing paint stripping compositions which meet the foregoing criteria. Many stripping compositions rely on the use of organic solvents such as benzene, toluene, cyclohexanone, ketones, mineral spirits and halocarbons. While such materials do have utility in particular applications, they are not generally applicable to large scale industrial stripping operations because of environmental hazards, flammability and cost. Inorganic alkaline materials such as sodium or potassium hydroxide are low cost, effective paint strippers; however, they are inherently dangerous materials and can damage a variety of substrates, particularly aircraft alloys. In many instances, organic based compositions are further activated by the inclusion of alkaline materials such as amines and inorganic alkalis, or by the inclusion of acidic accelerators such as mineral acids or organic acids. Inclusion of relatively small amounts of accelerators does enhance the stripping ability of prior art compositions, but as noted above, such materials can damage various substrates. Furthermore, the use and disposal of compositions including acidic or alkaline accelerators together with relatively large amounts of organic solvents is economically and environmentally unattractive.

U.S. Pat. No. 5,454,985, the disclosure of which is incorporated herein by reference, discloses a paint stripping composition based upon benzyl alcohol and water together with a coupling agent which solubilizes the benzyl alcohol in the water. This composition is further described as optionally including an accelerator therein which is an acidic or basic material. While the composition disclosed in the 5,454,985 patent is highly effective in removing a variety of paint compositions, it is difficult to safely remove particular epoxy or other resin based paints from aircraft alloys utilizing the acidic or alkaline activated stripping compositions disclosed therein. Accordingly, there is a need for a stripping composition which is safe to handle and use and which can effectively remove highly cross-linked paints from aluminum and/or magnesium based aircraft alloys. It is further desirable that any such stripping composition be relatively low in cost and water soluble or water miscible.

Because of pollution controls, and the cost of organic solvents, many manufacturers are turning to the use of products having a very low, or no, content of volatile organic compounds (VOCs). Accordingly there is a need for low VOC paint strippers, particularly paint strippers which are effective against highly crosslinked, resin based paints.

As will be explained in greater detail hereinbelow, the present invention provides a water based, low VOC paint stripper which is highly effective for removing a variety of paints and which will not corrode aluminum, magnesium, zinc, high strength specialty steels or other such reactive metals.

BRIEF DESCRIPTION OF THE INVENTION

There is disclosed herein a paint stripping composition which comprises, by weight, 5–95% of an organic solvent which is selected from the group consisting of benzyl alcohol, substituted benzyl alcohols, cyclohexane dimethanol, and combinations thereof; together with 5–95% of water and 0.2–20% of a peroxide. The stripping composition may further include ancillary ingredients such as thickeners, surfactants, wetting agents and evaporation retardants. Preferred peroxides include hydrogen peroxide and urea peroxide.

In particular embodiments, the organic solvent comprises benzyl alcohol, which may be present in an amount of 10–90% together with water in an amount of 90–10% and hydrogen peroxide in an amount of 0.2–8%. In other embodiments, the organic solvent may comprise 1–4 cyclohexane dimethanol, typically in an amount of 5–15% together with 60–90% water and 5–20% hydrogen peroxide. Some specific additives include hydroxy alkyl celluloses, xanthan gum, corn syrup or glycerine.

The present invention is also directed to a method for stripping paint compositions from a substrate. The method comprises providing a stripping composition which comprises 60–80% water together with 5–20% of a peroxide. In a second step of the method, the substrate is contacted with the stripping solution for a period of time sufficient to remove the paint therefrom. In one embodiment, the stripping composition includes 10–20% hydrogen peroxide. In other embodiments, the stripping solution may further include 5–15% of a water soluble organic solvent such as 1–4 cyclohexane dimethanol.

DETAILED DESCRIPTION OF THE INVENTION

In accord with the present invention it has been found that peroxide compounds are highly effective ingredients in a paint stripping composition which is operative at neutral or near neutral pH conditions. As used herein, the term "near neutral pH" refers to a pH in the approximate range of 4–10. While the prior art has employed hydrogen peroxide and like compounds in paint stripping compositions, nowhere in the prior art is there shown or suggested the compositions of the present invention. Furthermore, the compositions disclosed herein are superior to prior art compositions for removing particular paint compositions from sensitive substrates such as aircraft alloys.

All percentages given herein are weight percentages, and the compositions of the present invention particularly include 0.2–20% of a peroxide in a solvent base which includes a significant amount of water, and which may further include a water miscible or water soluble organic solvent. There are a number of peroxide compounds which may be employed in the practice of the present invention. Hydrogen peroxide ($H_2O_2$) is one particularly preferred material. It is low in cost, readily available and highly effective. Another preferred peroxide comprises urea peroxide ($CO(NH_2)_2 \cdot H_2O_2$), which is also known as percarbamide or carbamide peroxide. Urea peroxide is an easy to handle powdered material. Its effectiveness is similar to that of hydrogen peroxide in this invention.

One group of stripping compositions of the present invention are based upon mixtures of water, benzyl alcohol and hydrogen peroxide or urea peroxide, and typically include a coupling agent for solubilizing the benzyl alcohol in the water. These particular compositions are highly effective for removing cross linked paints such as epoxy based paints. Paints of this type are frequently employed in the aircraft industry for marking the exterior surfaces of airplanes. The fact that the compositions of the present invention have a near neutral pH makes them very useful for cleaning aircraft surfaces, since those surfaces frequently comprise aluminum or magnesium based alloys, or high-strength steels which are readily corroded by alkaline or acidic materials.

The benzyl alcohol based compositions may include between 5 and 95% of the benzyl alcohol together with 5–95% water and between 0.2 and 20% hydrogen peroxide. The particular ratios of materials employed will depend upon the paint composition which is being stripped. For aqueous based, high solids paints such as electrocoat primers and the like, the compositions will typically include larger amounts of water and peroxide, and smaller amounts of benzyl alcohol. For cross linked, resin based paints such as epoxy based paints, the mount of benzyl alcohol is typically increased to 20–60%, and the hydrogen peroxide is generally present in an amount of 0.2–8%. Similar formulations are also used for stripping conventional paint finishes comprising a high solids urethane top coat over an epoxy/urethane primer.

Benzyl alcohol is only slightly soluble in water, and in most benzyl alcohol/water based compositions an agent is typically included to stabilize the benzyl alcohol in water. Stabilization may be achieved by the addition of thickeners such as xanthan gum or hydroxy-alkyl celluloses. In other instances coupling agents may be employed as stabilizing agents. In general, the coupling agents comprise molecules having solubility in both organic and aqueous media. One particularly preferred group of couplers comprises sulfate salts such as sodium or potassium xylene sulfonate. Naphthalene sulfonate salts can also function as coupling agents. Salts of organic acids such as benzoate or heptanoate salts can also function as couplers. 1,4 butanediol, 1–5 pentanediol and similar polyhydric alcohols can also function as coupling agents. The amount of coupling agent employed will depend upon the nature of the agent itself as well as the proportions of benzyl alcohol and water employed in the stripper. It should be noted that within the context of the present invention, variously substituted benzyl alcohols may also be employed. The compositions of the present invention may further include ancillary ingredients such as surfactants, wetting agents, evaporation retardants and the like. Glycerine, corn syrup and similar materials may be employed to retard evaporation. And, one preferred surfactant comprises a non-ionic surfactant sold by Union Carbide under the designation TMN-3.

A second group of stripping compositions of the present invention comprises high-water-content strippers. These materials typically include 60–80% water, and preferably include a water miscible solvent such as 1–4 cyclohexane dimethanol in an amount of about 5–15% together with 5–20% of a peroxide.

It is to be understood that the compositions of the present invention constitute a continuum of compositions. For example, a high-water-content composition may include benzyl alcohol as well as 1–4 cyclohexane dimethanol in some instances.

Experimental

A first experimental series was carried out to evaluate various embodiments of benzyl alcohol based stripping compositions of the present invention. A series of compositions were prepared as follows:

Composition A

The first composition was comprised of:

40.0% benzyl alcohol
0.5% TMN-3
0.15% xanthan gum
0.75% hydroxy ethyl cellulose 52000
1.6% hydrogen peroxide
51.7% water
5.0% glycerol
0.3% CS 1135

The composition was prepared by blending the foregoing together. The hydrogen peroxide was employed as a 3% aqueous solution, and this 3% solution comprised 53.3% of the total composition; and accordingly, accounted for the water content. Hydroxy ethyl cellulose comprised a product sold by the Union Carbide corporation. The CS 1135 comprised an amine-based corrosion inhibitor sold by the Angus Chemical corporation; and the TMN-3 comprised a non-ionic surfactant sold by the Union Carbide corporation.

Composition B

A series of compositions (B–D) were prepared varying the concentration of hydrogen peroxide in the formulation of Example A. In Example B, the hydrogen peroxide concentration was reduced to 0.4%.

Composition C

In Example C, the hydrogen peroxide concentration was reduced to 0.8%.

Composition D

In Composition D, the hydrogen peroxide content was reduced to 1.0%.

Comparative Composition E

Composition E was identical to Composition A, except that it included no hydrogen peroxide.

Composition F

Composition F comprised a commercially available product sold by the McGean-Rohco Corporation of Cleveland, Ohio, under the designation CEE BEE E-2002A, and comprised an alkaline activated stripper.

Comparative Composition G

Composition G comprised a commercially available, formic acid activated stripper sold by the Turco Products Inc. of Westminster, Calif., under the designation 6776 L.O.

The thus prepared compositions were tested against painted, aviation alloy panels. In a first experimental series, the panels were painted with a standard commercial polyurethane, resin based moisture-curing primer sold under the designation Koroflex by the Courtaulds Aerospace corporation. The painted panels were cured at room temperature and then baked at 225° F. for 96 hours prior to the test to simulate aging. The panels were subsequently coated with the various compositions by pouring or brushing the compositions thereonto at room temperature. The data from the test is summarized in Table 1 hereinbelow.

TABLE 1

| Composition | Results | % Removal |
| --- | --- | --- |
| A | Blistered at 4.5 hrs | 100% |
| B | No blister at 4.5 hrs | 0% |
| C | Slight blister at 4.5 hrs | 90% |
| D | Blistered at 4.5 hrs | 100% |
| E | No blister at 24 hrs | 0% |
| F | No blister at 24 hrs | 0% |
| G | No blister at 24 hrs | 0% |

It will be seen from the foregoing, that inclusion of hydrogen peroxide in a benzyl alcohol/water based stripping composition greatly enhances its performance. Composition E represents the base composition without any peroxide, and it will be noted that after 24 hours of immersion, only a slight softening of the paint film was noticed, and this softened film redeposited back onto the substrate. Composition A and Composition D, which include the 1.6% and 1.0% peroxide respectively, caused significant blistering of the paint after 4.5 hours and resulted in 100% removal thereof. Reduction of peroxide content to 0.8% slightly reduced the efficacy of the composition. Reduction of the peroxide level to 0.4% produced no stripping effect after 4.5 hours; although, longer immersion times will produce some stripping effect. Also, it has been found that lower peroxide contents will still strip other paint compositions. Clearly, the peroxide enhances the stripping effect of the composition, and the degree of enhancement is proportional to the peroxide concentration. For comparative purposes, commercial products represented by Compositions F and G were included in the testing, and it will be noted that the compositions of the present invention exceeded the performance of these standard products.

A second experimental series was carried out utilizing a Koroflex primer coated panel which was not baked. The results of this test are summarized in Table 2 hereinbelow.

TABLE 2

| Composition | Results | % Removal |
| --- | --- | --- |
| A | Blistered after 2.7 hrs | 100% |
| E | Softened at 2.8 hrs | 0% |
| F | Softened at 2.8 hrs | 0% |
| G | Softened at 2.8 hrs | 0% |

Again, the experiment summarized in Table 2 detailed the advantages of the present invention. The paint was readily removed by Composition A after 2.7 hours immersion; whereas, the corresponding composition (E) minus the peroxide, as well as the commercial strippers of Compositions F and G, filled to remove any of the paint.

In accord with the present invention, it has also been found that peroxide containing compositions having relatively low, or no, loading of organic solvent may be employed to strip both low VOC coatings, as well as conventional, higher VOC coatings, from a variety of substrates. Compositions of this type typically include a somewhat higher loading of peroxide than do the foregoing organic containing compositions. In general, such compositions include between 60 and 80% water together with 5–20% of peroxide. If an organic solvent is present, it is preferably a water soluble or miscible solvent and generally comprises up to 25% of the composition. More typically the organic component comprises between 5 and 15% of the composition.

One particularly preferred organic solvent comprises 1,4 cyclohexane dimethanol. This material is soluble in water and comprises a low melting, readily super-cooled, solid. The commercial grade, which typically comprises 30% cis and 70% trans isomers has been found to be satisfactory for use in stripping compositions.

One particular composition comprises:

78.75% water
10.0% hydrogen peroxide
10.0% 1,4 cyclohexane dimethanol
1.0% hydroxy ethyl cellulose 52000
0.25 % surfactant (TMN-6)

The foregoing composition was tested against a series of painted substrates configured as follows:

Sample 6

This test panel comprised an aircraft alloy panel obtained from the Cessna Corporation. It was painted with a first primer layer, a sanding coat comprising an epoxy type paint, and a gloss top coat of a polyurethane material. The stripping composition removed the top coat and epoxy in 7 hours and 41 minutes; the first primer was left intact.

Sample 10

This sample comprised a panel coated with a 4–6 mil thick layer of epoxy based paint fabricated by the Akzo Corporation and sold under the designation Green BAC 452 epoxy primer. This paint meets Boeing standards BMS 10–11 and BMS 10–72 for aircraft primers. The composition of the present invention stripped the paint layer away in 4 hours and 56 minutes.

Sample 13

This sample comprised a panel coated with a layer of epoxy based primer obtained from Raytheon (Beech). It was stripped clean by the composition of the present invention in 5 hours.

Sample 23

This sample comprised a test panel obtained from the Boeing corporation. It was coated with a primer meeting Boeing standard BMS 10–11. The composition of the present invention stripped this layer in 3 hours.

Sample 30

This sample is representative of materials typically encountered in the field. It comprised an aircraft alloy panel coated with a primer layer which was not specified, but which appeared to be an epoxy based paint, covered with a top coat of white paint of unknown composition. This panel was stripped clean in 4 hours.

Sample 34

This sample comprised a layer of Koroflex primer baked on to a panel of aircraft alloy at 225° F. for 96 hours to simulate aging. This sample corresponded to those samples which were described hereinabove with reference to the data of Table 1. The composition of the present invention described hereinabove stripped the panel in 1 hour and 34 minutes.

It has further been found that substitution of urea peroxide for hydrogen peroxide, on an equimolar basis, provides a stripping composition which is highly effective against the foregoing paints. Other peroxide compounds such as peroxyborates and sulfates will also provide similar results.

A third experimental series was carried out to further investigate the concentration effects in the stripping compositions of the present invention under varying pH conditions. In these experiments, a series of paint stripping compositions basically comprising thickened, aqueous benzyl alcohol based strippers were prepared including varying amounts of hydrogen peroxide. In addition, some of the strippers were acidified by the addition of formic acid, while others were made alkaline by the addition of an amine. The compositions were tested against a series of painted panels, and comparison was made with a commercial stripper. The compositions were evaluated on the basis of the time required for removal of the paint.

The specifics of the compositions, and the test data, are summarized in Table 3. It will be noted that the compositions therein are all listed by weight, and each included 40% benzyl alcohol. Each also included 0.5% by weight of the TMN-3 non-ionic surfactant described hereinabove, together with 0.38% of methoxy cellulose of the type sold under the designation Methocel K 15M by the Dow Chemical Corporation. Each composition also included 5% glycerine. The alkaline compositions included 0.3% of the amine based rust inhibitor sold by the Angus Chemical Company under the designation CS 1135, while the acidic compositions all included 10% formic acid (90% solution). In addition, the acidic compositions included 0.5% of a rust inhibitor sold under the designation Butoxyne 497 by ISP Inc. The concentration of hydrogen peroxide was controlled between the approximate range of 0–19%, and water content was changed to compensate for changes in the peroxide concentration. The compositions were all tested against portions of an aircraft panel obtained from Gulf Stream Aviation. The panel was painted with a polyurethane top coat material sold by the Pratt and Lambert Corporation under the designation BMS-10.72. This top

TABLE 3

| | TURCO 6776 | ACID | | | | | | NEUTRAL | | | | | | |
|---|---|---|---|---|---|---|---|---|---|---|---|---|---|---|
| | | A | B | C | D | E | F | G | H | I | J | K | L | M |
| Benzyl Alcohol | NA | 40 | 40 | 40 | 40 | 40 | 40 | 40 | 40 | 40 | 40 | 40 | 40 | 40 |
| TMN 3 | " | 0.5 | 0.5 | 0.5 | 0.5 | 0.5 | 0.5 | 0.5 | 0.5 | 0.5 | 0.5 | 0.5 | 0.5 | 0.5 |
| Methocel K15M | " | 0.38 | 0.38 | 0.38 | 0.38 | 0.38 | 0.38 | 0.38 | 0.38 | 0.38 | 0.38 | 0.38 | 0.38 | 0.38 |
| DI Water | " | 43.62 | 42.22 | 39.02 | 35.12 | 23.82 | 43.62 | 54.12 | 52.72 | 49.52 | 45.62 | 34.12 | 19.82 | 0.12 |
| Glycerine 96% | " | 5 | 5 | 5 | 5 | 5 | 5 | 5 | 5 | 5 | 5 | 5 | 5 | 5 |
| CS 1135 | " | 0 | 0 | 0 | 0 | 0 | 0 | 0 | 0 | 0 | 0 | 0 | 0 | 0 |
| Formic Acid | " | 10 | 10 | 10 | 10 | 10 | 10 | 0 | 0 | 0 | 0 | 0 | 0 | 0 |
| Butoxyne 497 | " | 0.5 | 0.5 | 0.5 | 0.5 | 0.5 | 0.5 | 0 | 0 | 0 | 0 | 0 | 0 | 0 |
| $H_2O_2$ 35% | " | 0 | 1.4 | 4.6 | 8.5 | 20 | 34.3 | 0 | 1.4 | 4.6 | 8.5 | 20 | 34.3 | 54 |
| Total | 100 | 100 | 100 | 100 | 100 | 100 | 100 | 100 | 100 | 100 | 100 | 100 | 100 | 100 |
| $H_2O_2$ % | NA | 0 | 0.5 | 1.6 | 3 | 7 | 12 | 0 | 0.5 | 1.6 | 3 | 7 | 12 | 18.9 |
| TIME (HOURS) | 4.25 | DNS | DNS | 12 | 3.7 | 3.9 | 2.3 | DNS | DNS | 8 | 4.5 | 3 | 3 | 2.8 |

| | TURCO 6776 | ALKALINE | | | | | | |
|---|---|---|---|---|---|---|---|---|
| | | N | O | P | Q | R | S | T |
| Benzyl Alcohol | NA | 40 | 40 | 40 | 40 | 40 | 40 | 40 |
| TMN 3 | " | 0.5 | 0.5 | 0.5 | 0.5 | 0.5 | 0.5 | 0.5 |
| Methocel K15M | " | 0.38 | 0.38 | 0.38 | 0.38 | 0.38 | 0.38 | 0.38 |
| DI Water | " | 53.82 | 52.42 | 49.22 | 45.32 | 33.82 | 19.52 | 0 |
| Glycerine 96% | " | 5 | 5 | 5 | 5 | 5 | 5 | 5 |
| CS 1135 | " | 0.3 | 0.3 | 0.3 | 0.3 | 0.3 | 0.3 | 0.3 |
| Formic Acid | " | 0 | 0 | 0 | 0 | 0 | 0 | 0 |
| Butoxyne 497 | " | 0 | 0 | 0 | 0 | 0 | 0 | 0 |
| $H_2O_2$ 35% | " | 0 | 1.4 | 4.6 | 8.5 | 20 | 34.3 | 53.82 |
| Total | 100 | 100 | 100 | 100 | 100 | 100 | 100 | 100 |
| $H_2O_2$ % | NA | 0 | 0.5 | 1.6 | 3 | 7 | 12 | 18.8 |
| TIME (HOURS) | 4.25 | DNS | DNS | 7 | 4.5 | 3.1 | 2.3 | 2.2 |

DNS = DID NOT STRIP

TABLE 4

| | A | B | C | D | E | F | G | H | I | J |
|---|---|---|---|---|---|---|---|---|---|---|
| Benzyl Alcohol | 10 | 20 | 30 | 40 | 60 | 10 | 20 | 30 | 40 | 60 |
| TMN 3 | 0.5 | 0.5 | 0.5 | 0.5 | 0.5 | 0.5 | 0.5 | 0.5 | 0.5 | 0.5 |
| Methocel K15M | 0.38 | 0.38 | 0.38 | 0.38 | 0.38 | 0.38 | 0.38 | 0.38 | 0.38 | 0.38 |
| DI Water | 84.12 | 74.12 | 64.12 | 54.12 | 34.12 | 64.12 | 54.12 | 44.12 | 34.12 | 14.12 |

TABLE 4-continued

|  | A | B | C | D | E | F | G | H | I | J |
|---|---|---|---|---|---|---|---|---|---|---|
| Glycerine 96% | 5 | 5 | 5 | 5 | 5 | 5 | 5 | 5 | 5 | 5 |
| H₂O₂ 35% | 0 | 0 | 0 | 0 | 0 | 20 | 20 | 20 | 20 | 20 |
| CS-1135 Amine | 0 | 0 | 0 | 0 | 0 | 0 | 0 | 0 | 0 | 0 |
| Formic Acid 90% | 0 | 0 | 0 | 0 | 0 | 0 | 0 | 0 | 0 | 0 |
| Butoxyne 497 | 0 | 0 | 0 | 0 | 0 | 0 | 0 | 0 | 0 | 0 |
| Total | 100 | 100 | 100 | 100 | 100 | 100 | 100 | 100 | 100 | 100 |
| Strip Time (minutes) | 77 | 84 | 45 | 45 | 45 | 60 | 58 | 38 | 33 | 35 | coat was deposited upon two layers of epoxy based primer. The dry film thickness of the paint layers was 5.8 mils. The panels were tested by immersing them in the various stripping compositions for a sufficient time to remove the coating. The time required, in hours, is shown in the table. For purposes of comparison, performance of the commercial, formic acid based stripper, Turco 6776, described as Composition G hereinabove, was also similarly evaluated.

It will be seen from the table that in this test, no significant stripping action was produced with compositions having peroxide concentrations of less than, 5%, and stripping action generally increased with increasing peroxide concentration. It is notable that the presence of either formic acid or an amine did not significantly change stripping rates. The most important factor in the action of the compositions is the presence of the peroxide.

A fourth experimental series was carried out to investigate the effect of peroxide concentration at varying concentrations of benzyl alcohol, in a water/benzyl alcohol based stripping system. A series of stripping compositions, generally similar to those described with reference to the third experimental series, were prepared in which benzyl alcohol concentration was varied from 10–60%. In one group of compositions, the peroxide concentration was held at approximately 7% (i.e. 20% by weight of a 35% solution). Yet another set of compositions included no peroxide. These samples were tested against an aircraft panel obtained from a Southwest Airlines 737 commercial airliner coated with a standard commercial coating sold under the designation Dexter Crown Metro fuel resistant coating. The compositions were applied to vertically resting panels, and the stripping time in minutes was noted.

The data is summarized in Table 4, and it will be noted that in both the peroxide free, and the peroxide containing compositions, rapidity of stripping is generally proportional to the concentration of benzyl alcohol present. It will also be noted that in all instances, the presence of the peroxide significantly enhances the stripping action. It will be appreciated from the foregoing that even compositions having very low concentrations of organic solvent function efficiently as strippers for highly cross linked, fuel resistant coatings, when peroxide is present.

It will thus be seen that the compositions described hereinabove are capable of rapidly and completely stripping a variety of different paint compositions from a substrate. The compositions may be made to be of a neutral or nearly neutral pH so as to not corrode or otherwise degrade aircraft alloy materials. It is further notable that the compositions are relatively low in cost, of low toxicity and completely water soluble.

It will be appreciated from the discussion, description and examples presented herein that paint stripping compositions incorporating peroxides therein are highly effective against a variety of paint materials. The compositions of the present invention typically include significant amounts of water therein, and in some instances may be almost completely water based. In particular instances, highly effective paint stripping compositions comprise hydrogen peroxide or urea peroxide together with water and an organic solvent which may be a benzyl alcohol or cyclohexane dimethanol.

While the foregoing discussion, description and examples refer to some specific formulations structure in accord with the present invention, it should be kept in mind that the formulations are illustrative of some embodiments of the present invention, but are not meant to be limitations upon the practice thereof. The specific compositional ranges employed will depend upon the paint formulation being stripped and the rapidity of the desired stripping action. It is the following claims, including all equivalents, which define the scope of the invention.

We claim:

1. An aqueous paint stripping composition consisting essentially of, by weight:

10–60% of an organic solvent selected from the group consisting of: benzyl alcohol, substituted benzyl alcohols, and combinations thereof; and 8–20% of a peroxide.

2. A composition as in claim 1, wherein said peroxide is selected from the group consisting of: hydrogen peroxide, urea peroxide and combinations thereof.

3. A composition as in claim 1, further including an ancillary ingredient selected from the group consisting of: thickeners, surfactants, wetting agents, evaporation retardants, and combinations thereof.

4. A composition as in claim 1, wherein said organic solvent comprises benzyl alcohol.

5. A paint stripping composition as in claim 1, further including members selected from the group consisting of: hydroxy alkyl cellulose, xanthan gum, corn syrup, glycerine, and combinations thereof.

6. An aqueous paint stripping composition comprising by weight:

5–95% cyclohexane dimethanol and

5–20% of a peroxide.

7. A composition as in claim 6, wherein said peroxide is selected from the group consisting of: hydrogen peroxide, urea peroxide and combinations thereof.

8. A composition as in claim 6, further including an ancillary ingredient selected from the group consisting of: thickeners, surfactants, wetting agents, evaporation retardants, and combinations thereof.

9. A paint stripping composition as in claim 6, further including members selected from the group consisting of: hydroxy alkyl cellulose, xanthan gum, corn syrup, glycerine, and combinations thereof.

* * * * *

UNITED STATES PATENT AND TRADEMARK OFFICE
CERTIFICATE OF CORRECTION

PATENT NO. : 5,721,204
DATED : February 24, 1998
INVENTOR(S) : Jeffrey W. Maxwell et al.

It is certified that error appears in the above-indentified patent and that said Letters Patent is hereby corrected as shown below:

Column 3, line 47, delete "mount, and insert --amount--.

Column 5, line 67, delete "filled", and insert --failed--.

Column 10, line 36, delete "8", and insert --.8--.

Column 10, line 52, delete "5-95%", and insert --5-15%--.

Signed and Sealed this

Thirtieth Day of June, 1998

Attest:

BRUCE LEHMAN

*Attesting Officer*

*Commissioner of Patents and Trademarks*